United States Patent

Peters, Jr. et al.

[11] Patent Number: 6,042,721
[45] Date of Patent: Mar. 28, 2000

[54] EFFLUENT TREATMENT APPARATUS

[75] Inventors: John Peters, Jr., Center Moriches; James Lee McManus, Oakdale, both of N.Y.

[73] Assignee: Fabco Industries, Inc., Holtsville, N.Y.

[21] Appl. No.: 08/899,236

[22] Filed: Jul. 23, 1997

[51] Int. Cl.$^7$ .................................................. B01D 29/00
[52] U.S. Cl. ............................ 210/85; 210/91; 210/130; 210/143; 210/195.1; 210/196; 210/248; 210/253; 210/257.1; 210/258; 210/340; 210/424; 210/436
[58] Field of Search .......................... 210/91, 138, 195.1, 210/196, 340, 341, 130, 167, 248, 253, 257.1, 258, 416.1, 424, 143, 85, 436

[56] References Cited

U.S. PATENT DOCUMENTS

| | | | |
|---|---|---|---|
| 2,269,315 | 1/1942 | Nelson et al. | 210/33 |
| 3,502,220 | 3/1970 | Kohlberg | 210/416.1 |
| 4,032,439 | 6/1977 | Oldham | 210/17 |
| 4,478,714 | 10/1984 | Blake et al. | 210/340 |
| 4,565,633 | 1/1986 | Mayenkar | 210/688 |
| 4,566,975 | 1/1986 | Allgulin | 210/711 |
| 4,578,195 | 3/1986 | Moore et al. | 210/679 |
| 4,758,335 | 7/1988 | Hayden | 210/90 |
| 5,192,424 | 3/1993 | Beyne et al. | 210/91 |
| 5,622,630 | 4/1997 | Romano | 210/683 |

OTHER PUBLICATIONS

Pure Flow FE–55 System, Fabco sales brochure, pp. 1–6, 1996.
Summary Sheet for Pure Flow FS–55 (Effluent Treatment Apparatus), by Fabco, Holtsville, New York 1997.

*Primary Examiner*—Matthew O. Savage
*Attorney, Agent, or Firm*—Island Patent Associates

[57] ABSTRACT

An effluent treatment apparatus, and associated methods of use, are provided for treating in a closed-loop configuration a volume of effluent contained in a holding vessel. The apparatus includes one or more treatment tank units arranged to hold a volume of molecular filtering material capable of removing one or more toxic contaminants from the effluent, al least in part, as the effluent contacts the surface areas of the molecular filtering material within each tank unit. A pump unit is provided to draw effluent from the holding vessel and deliver the effluent to selected tank units to effect treatment. The apparatus further includes fluidic conduit structures to fluidically couple the holding vessel, a pre-filter, the pump, and each selected tank unit. The conduit structure forms a closed-loop wherein effluent drawn from the holding vessel is pre-filtered, delivered to each selected tank unit, treated by contacting the molecular filtering material as the effluent flows through the tank unit, and returned to the holding vessel, repeatedly as required for treatment of the volume of effluent. A pressure regulation and bypass arrangement coupled via the conduit structure in a shunting configuration with respect to the tank units may also be provided with the invention to enable the pressure at which the treatment in the tank unit is conducted to be maintained at or below a pre-selected pressure level, even when the flow of effluent through one or more selected tank units is significantly restricted.

14 Claims, 12 Drawing Sheets

FIG. 4D

| | MODE | V1 | V2 | V3 | V4 | V5 | FIGURE |
|---|---|---|---|---|---|---|---|
| 1 | SINGLE - TANK A | c→b | b→a | b→c | a→b | b→a | Fig. 4A |
| 2 | SINGLE - TANK B | c→b | b→a | b→c | c→b | b→c | N/I |
| 3 | DUAL TANK | c→b | b→a | b→c | a,c→b | b→a,c | Fig. 4B |
| 4 | DRAIN (DUAL) | a→b | b→c | b→a | a,c→b | X | Fig. 4C |

FLOW: IN→OUT    X = NO FLOW    N/I = NOT ILLUSTRATED

EFFLUENT TREATMENT APPARATUS

BACKGROUND OF THE INVENTION

1. Field of the Invention

The present invention relates generally to filtration and purification systems. More particularly, the invention relates to a treatment apparatus and closed-loop methods to treat an effluent containing at least one contaminant that is to be removed, at least in part, from the effluent and neutralized.

2. Description of the Prior Art

The issues and problems of disposing of effluents containing contaminants, wherein the disposal must be environmentally safe and non-polluting, are well known. Also well understood is the need for improved and full featured means and methods for filtering and or treating such effluents, in an inexpensive way so as to provide a resulting volume of liquid (treated effluent), and an associated molecular filtering material (providing the treatment medium) that may be discarded or disposed of in a manner consistent with that of non-toxic waste. The contaminants typically found in common effluents may include heavy metal molecules (e.g., cadmium), petroleum product fluids, alcohol and glycol molecules, and other known toxins. It would be most desirable to be able to treat such effluents to reduce the level of such contaminants to acceptable levels (as specified, for example, by government agencies) to enable low cost disposal and or recycling of the effluent as well as the spent volume of molecular filtering material.

There are presently a number of known materials that are employable with a variety of filter and treatments systems. These materials include activated carbons, activated alumina, silica, and the like. However, a preferred molecular filtering material may be provided by one or more known Zeolite substances. Zeolites, unlike activated carbon and activated alumina, have a regular and ordered crystalline structure and consequently possess pores of uniform diameter, typically in the range of 3 A to 10 A. The regular structure of molecular filtering materials, such as zeolites, provides a complex network of apertures (of constant size) that operate to cage contaminate molecules to be removed (e.g., adsorbed) from the effluent. Skilled artisans will appreciated the characteristics and functional molecular filtering capabilities of zeolite 'molecular sieves', especially their long term stability wherein contaminants are contained therein and effectively neutralized. This is especially true when considering leaching over a long period of time, even when exposed to caustic and acidic solutions. A particularly preferred molecular filtering material, which may treat an effluent containing a plurality of contaminates, may be provided by a mixture and blend of molecular filtering materials, including a variety of zeolite materials.

There are two commonly utilized methods used to apply molecular filtering materials (MFMs) to effluents. The first is to simply place a volume of the MFM in a container, possibly the storage or holding container, and mix and homogenize the mixture. The mixing may be performed by hand, say using a paddle or shovel, or may be provided for by power assisted hand-holdable mixing devices. Alternately, conventional mixing devices, such as cement-like mixers, may be employed to homogenize the mixture of effluent and the associated MFM. This first method can be labor intensive and time consuming. In addition, the effluent will typically have to be transferred from a holding vessel to, for example, a treatment container or the cement-like mixing device. For safety reasons, the transfer of the raw, untreated effluent is not desired. Further, the homogenized mixture is required to 'sit', while the adsorption or occlusion process completes, for many hours, and in some instances for as long as 3 days or longer. The latter temporal period being considered prohibitive to the rapid treatment of large volumes of effluent in an efficient and safe manner.

An alternate method known to treat effluent, particularly suited to large volumes of effluent, is typified and possibly improved upon by U.S. Pat. No. 5,622,630 to Romano. Romano teaches using an apparatus having one or two pumps, along with one or more complex tank arrangements comprised of a 'stack' of cylindrical members. The effluent is drawn from a storage means (shown as a pool in FIG. 4 of Romano) and caused to flow through one or more tank stacks, in succession. The treated effluent is then passed to a second storage tank or a suitable means to receive the treated fluid, possibly via a second pump. It may be noted, as disclosed in the preferred embodiment of FIG. 4 of Romano, the second pump 69, seems to be required for practical operation of the disclosed system. Although the Romano invention seems to provide a method and means to significantly reduce the labor involved with treatment activities, it is limited in several other respects. First, as disclosed, it includes a complex tank structure to effect the treatment of the effluent. This complex tank arrangement is costly and requires a significant amount of time to setup before treatment activities can be conducted, and possibly requires an equal or greater amount of time to disassemble after treatment to remove the spent treatment materials employed. This temporal overhead is primarily due to the significant number of 'cylindrical compartment members' that compose each tank structure and the requirement that each member be accessed individually. It can be noted that the Romano invention appears to include the complex tank structure to enable a "single open loop pass" of the effluent through the system to contact a sufficient volume of filtering material to appropriately treat the effluent. Accordingly, the Romano apparatus requires a significant volume of 'zeolite pebbles' be employed and provides no guarantee that the zeolite or other employed molecular filtering material has been fully spent. As such, the Romano apparatus may result (possibly often) in the under usage of the actual available capacity of the molecular filtering materials employed. Indeed, with the open-loop system disclosed by Romano, a conservative operator would prefer an excess volume MFM be utilized for a treatment operation, rather than too small a volume—for obvious reasons.

Skilled persons will therefore recognize the need for improved treatment systems, and associated methods of use, to effectively and efficiently support the treatment of varying effluents. Objects of the present invention are, therefore, to provide new and improved apparatus and methods to treat a volume of effluent containing at least one contaminate, wherein the treatment activities reduce said contaminant(s) to acceptable levels, having one or more of the following capabilities, features, and/or characteristics:

includes fluidic conduits providing for a closed-loop arrangement wherein an effluent is drawn from a holding vessel, pre-filtered, appropriately treated, and returned to the original holding vessel, repeatedly, as required for full and though treatment;

the closed-loop characteristic minimizes the 'open air' contact of raw effluent during the treatment process;

full and complete use of a volume of molecular filtering material, or possible equivalents, to effect the reduction of the at least one contaminant contained in a volume of effluent;

treatment tanks enable the internal, forced and efficient contacting of the effluent with the surface areas of the volume of molecular filtering material;

low cost tank units having very simple construction;

pre-filter provided to protect at least one integral pump unit, and other effluent contacting components;

safety features including a shunting pressure regulation and bypass arrangement to effect the effluent treatment at or below a pre-selected (and safe) pressure;

provides for closed-loop bypass and complete containment of possibly partially treated effluent in the event of an over-pressure situation in one or more selected tank units;

controller or microprocessor based apparatus supporting automated and or automatic operation;

incorporates a modular, advanced manifold and valve assembly that greatly reduces the space (volume) typically required to house an equivalent component providing the same functionality;

tank units equipped with vacuum breaking devices to enable the rapid forced removal of the tankage from one or more selected tank units that are to be drained;

embodiments may be arranged to support the draining and replacement of the MFM of one tank unit, while other tank units are actively treating effluent;

flow metering to determine the volume of effluent that has flowed through the tank units, and contacted one or more volumes of molecular filtering material contained therein;

relatively low cost, and modular design, using a number of known, low cost, and readily available components and devices.

The above listed objects, advantages, and associated novel features of the present invention, as well as others, will become more clear from the description and figures provided herein. Attention is called to the fact, however, that the drawings are illustrative only. Variations are contemplated as being part of the invention, limited only by the scope of the appended claims.

SUMMARY OF THE INVENTION

In accordance with the invention, an effluent treatment apparatus, and associated methods of use, are provided to effect the closed-loop treatment of a volume of effluent contained in a holding vessel. The apparatus includes at least one treatment tank unit having an input port to enable the effluent to enter the tank unit and an output port to enable the effluent to exit from the tank unit. Each tank unit is arranged to hold and enclose a volume of molecular filtering material capable of removing at least one contaminant from the effluent, at least in part, as the effluent forcibly contacts the surface areas of the molecular filtering material within the respective tank units. A pump unit is provided to draw effluent from the holding vessel and deliver the effluent to one or more selected tank units to effect treatment. A pre-filter is positioned in-line with the pump unit to filter from the effluent any larger debris materials contained therein as the effluent is drawn from the holding vessel and delivered via the pump to each tank unit. The apparatus further includes conduit means to fluidically couple the holding vessel, the pre-filter, the pump unit, and the tank units. Specifically, the conduit means (in conjunction with the above disclosed components) forms the closed-loop wherein effluent drawn from the holding vessel, pre-filtered, and delivered to at least one tank unit through its input port.

The effluent is then treated by contacting the surface areas of the molecular filtering material contained within the tank unit as it (the effluent) flows through the tank, and is returned via the output port to the holding vessel. The treatment process, wherein the effluent is passed through at least one tank unit, being conducted for a sufficient temporal interval, using one or more volumes of molecular filtering material to enable the contaminates present in the effluent to be reduced, at least in part, to acceptable levels to possibly enable the treated effluent, and the associated volumes of molecular filtering material, to be discarded in a manner consistent with that of non-toxic waste.

The addition of a pressure regulation and bypass arrangement, coupled via the conduit means in a shunting configuration with respect to the tank units, may also be provided with the invention to enable the pressure at which the treatment is conducted (within the one or more tank unit) to be maintained at or below a pre-selected pressure level, even when the flow of effluent through the tank unit(s) is significantly restricted. Accordingly, the pressure and regulation arrangement enables the safe and 'contained' bypass of raw or partially treated effluent, while maintaining the pressure within tank units at or below a safe level.

BRIEF DESCRIPTION OF THE DRAWINGS

In the drawings, like elements are assigned like reference numerals. The drawings are briefly described as follows:

FIG. 4D provides a table defining specific arrangements (setting) of the valves employable to establish the fluidic couplings illustrated in FIGS. 4A, 4B, and 4C.

LIST OF REFERENCE NUMERALS USED IN THE DRAWINGS

10 effluent treatment apparatus

Figure 1:
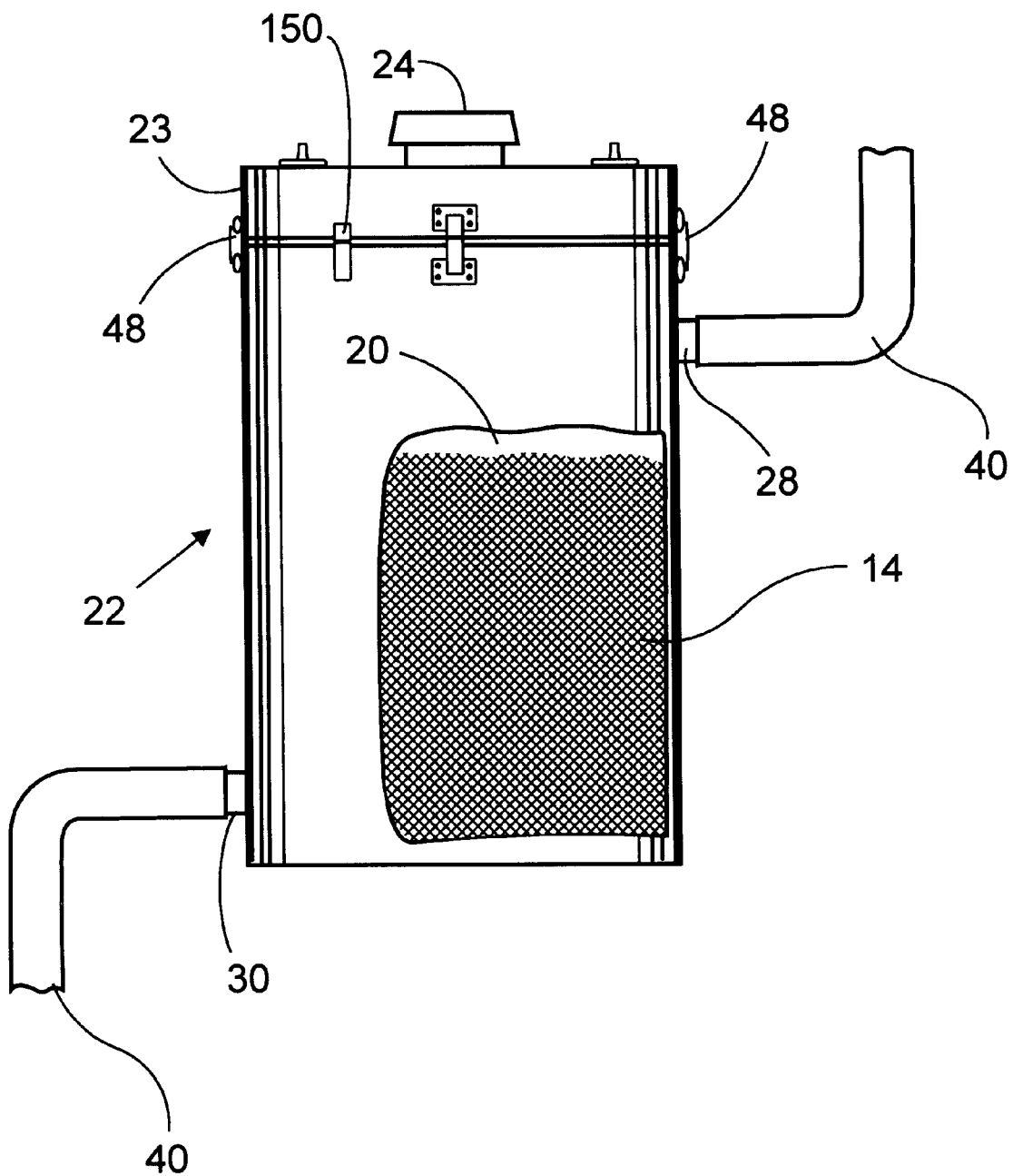
FIG. 1 is a partial cut-away view of a tank unit in accordance with the present invention.

12 holding vessel 14 molecular filtering material
16 pre-filter
18 pump unit
20 interior cavity (of tank unit)
22 (treatment) tank unit
23 movable portion (of tank unit)
24 vacuum breaker
26 manifold and valve assembly
28 input port (of tank unit)
30 output port (of tank unit)
32$a$ input conduit
32$b$ output conduit
34 control module
36 input port supply conduit
38 output port return conduit
40 conduit means
42 pressure release and bypass valve
44 flow meter
48 securing means
100 control panel
120 controller
130 interface circuitry
140 user interface
142 display means
142$a$ display (total run time)
142$b$ display (remaining time)
142$c$ displays (tank pressure)
142$d$ displays (flow data)
146 switch means
146$a$ switches (tank select)
146$b$ switches (operation)
146$c$ switches (settings and input)
146$d$ switch (start/stop)
146$e$ switch (reset)
150 detection means
V1–V5 valves
V1'–V5' valves (alternate arrangement)

DETAILED DESCRIPTION OF THE INVENTION

It is important to establish the definition of a number of terms that will be used throughout this disclosure. The term 'effluent' is to be defined as any liquid mixture containing contaminants including heavy metals, chemicals, petroleum particulates, glycol, and or the like, that may be treated by the present invention. The terms 'fluidically coupled' and 'fluidic coupling' are to be defined as the necessary conduits, couplings, tubing, fluidic connections, and the like, possibly including fluidic controlling valves, which may be employed to draw and or deliver effluent from a first location to a second location. In this context the movement of effluent from location to location may actually indicate the transport of effluent between items including a tank, a pump, a vessel, etc. Other characteristics and functions provided by said fluidic coupling arrangements will be discussed and addressed below. An important limitation provided by the apparatus disclosed herein, regards the completely "closed-loop" configuration that is provided by the present invention. This limitation enables the full capability of a volume of molecular filtering material, MFM, to be used. That is, the present invention provides for the MFM to be completely spent via the closed-loop arrangement, utilizing the MFM's full adsorptive capacity before being discarded. Other important terms and definitions will be included, as needed below, to properly and concisely define the present invention and its associated novel characteristics and features.

Referring now to FIG. 1, there is illustrated a partially cut-away view of an embodiment of a treatment tank unit 22. The tank unit 22 includes an input port 28 to enable the effluent to enter the tank unit 22 (at the top as depicted), and further includes an output port 30 to enable the effluent to exit from the tank unit 22. The tank unit 22 is arranged to hold a volume of molecular filtering material 14, or MFM, in an interior cavity 20. The MFM is capable of removing at least one contaminant from the effluent as the effluent contacts the surface areas of the molecular filtering material while flowing (i.e., being forcedly or forcibly pumped) through the tank unit 22. The tank unit 22 is configured with a movable portion 23 having an open position to enable the molecular filtering material 14 to be placed within or removed from the interior cavity 20 of the tank unit 22 (the open position not explicitly shown in FIG. 1), and a closed position, as illustrated in FIG. 1. The movable portion 23 of the tank unit 22 is secured in the closed position for conducting effluent treatment. As such, in order to secure the movable portion 23 in the closed position for treatment, each tank unit 22 will typically also include a securing means 48 (e.g., a securing clasp) and a suitable sealing arrangement (e.g., one or more gaskets, or the like). The securing means 48, accordingly, is included to properly seal the movable portion in the closed position eliminating any (undesired) leaking of effluent from the tanks unit 22, while the effluent is being treated by flowing through the tank unit 22. It should be understood that the securing means 48, and any required sealing means, are well known in the art and may be provided by skilled persons.

The molecular filtering material 14, which can be seen occupying the interior cavity 20 through the cut-away section of tank unit 22 of FIG. 1, may be provided by any suitable filtering material, including those exhibiting adsorptive and occlusive characteristics. In a preferred embodiment the molecular filtering material 14 may be comprised of a mixture of materials including one or more zeolite materials. In an especially preferred embodiment the molecular filtering material would be provided by particles have a granular coarseness ranging from a 'fine sand' to pea size. Further, the molecular filtering material (MFM) may be packaged within a fine 'net-like' material having appropriately sized openings to enable effluent to easily pass through, while retaining the MFM therein. The net-like packaging, which is also known to skilled persons, may be employed to provide a pre-measured known volume (of MFM) to enable an operator to easily control the exact the volume of MFM being loaded in each respective tank unit 22, and additionally to facilitate the easy loading and removal of the MFM when accessing the interior cavity 20 of the tank unit 22 via the movable portion 23 thereof.

As can be further seen in FIG. 1, a vacuum breaker 24 may be provided to enable any effluent present in the tank, which will be generally referred to as the tankage of the tank unit 22, to be (somewhat) rapidly removed from the tank unit 22 while the movable section 23 is in the closed position. Typically the tankage is drained and returned to the holding vessel 12. Also shown in FIG. 1 is conduit means 40, provided to fluidically couple the input port 28 and the output port 30, as well as other components, as required to enable the effluent to be appropriately treated (to remove contaminants therefrom). As can be seen, the input port 28 and output port 30 may be diametrically positioned, in order to maximize the contacting of the effluent with the surface areas of the molecular filtering material 14 with each 'pass' of the effluent through the tank unit 22 to provide for a maximum amount of contaminant removal in a minimal temporal period.

Figure 2:
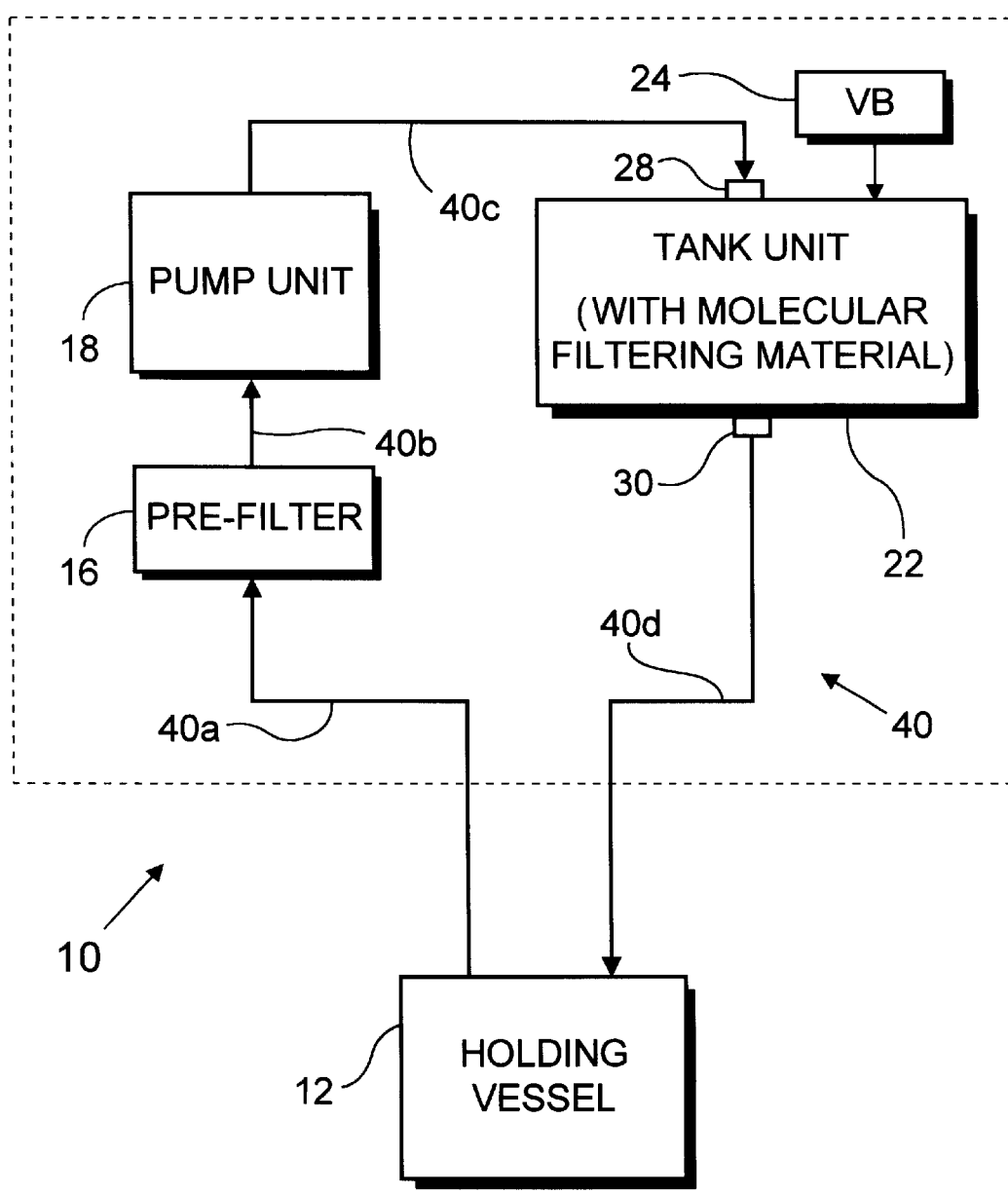
FIG. 2 illustrates a high level block diagram of a first (fundamental) embodiment of the invention.

Referring now to FIG. 2, there is illustrated a high level block diagram of a first (and fundamental) embodiment of the effluent treatment apparatus 10 of the present invention. The effluent to be treated is held or stored in a holding vessel 12 until treatment is to be conducted. A pump unit 18 is employed to draw effluent from the holding vessel 12 and deliver the effluent to the tank unit 22 through the input port 28. A pre-filter 16 is positioned in-line with the pump to filter any larger debris material contained in the effluent as it is drawn from the holding vessel 12 and delivered via the pump unit 18 to the treatment tank 22. It may be noted that the conduit 40a, which may be termed a suction tube or suction conduit, when combined with other shown conduits 40b, 40c, and 40d, may be generally termed 'conduit means', and will be generally referred to as conduit means 40. Those skilled in the art will appreciate the number of varied arrangements that may provide the conduit means needed to support the effluent treatment apparatus 10. Regardless of the specific configurations and materials utilized, the conduit means 40 is provided to fluidically couple the holding vessel 12, the pre-filter 16, the pump unit 18, and the tank unit 22, to form a closed-loop. Accordingly, the effluent is drawn from the holding vessel 12, filtered by pre-filter 16, delivered to the tank unit 22 through the input port 28, treated by contacting the molecular filtering material as the effluent flows through the task unit 22, and then returned via the output port 30 (and the conduit means) to the holding vessel 12. The effluent is thereby 'repeatedly' passed through the MFM 14, with the contaminants sufficiently adsorbed by the treatment activities being conducted in this (or an equivalent) closed-loop for a sufficient temporal period.

As can be seen in FIG. 2, if the tank unit 22 is elevated with respect to the holding vessel 12, when the pump unit 18 is not energized, the tankage of tank unit 22 may drain (due to gravity and the inclusion of vacuum breaker 24) from the tank unit 22 through the conduit 40d back to the holding vessel 12. This feature will be further addressed below. Once the tankage has been removed from the tank unit 22, the movable portion 23, may be removed and the molecular filtering material 14 refreshed (i.e., replaced) to continue treating the original volume of effluent (that may be only partially treated) or another volume of effluent requiring treatment.

Figure 3A:
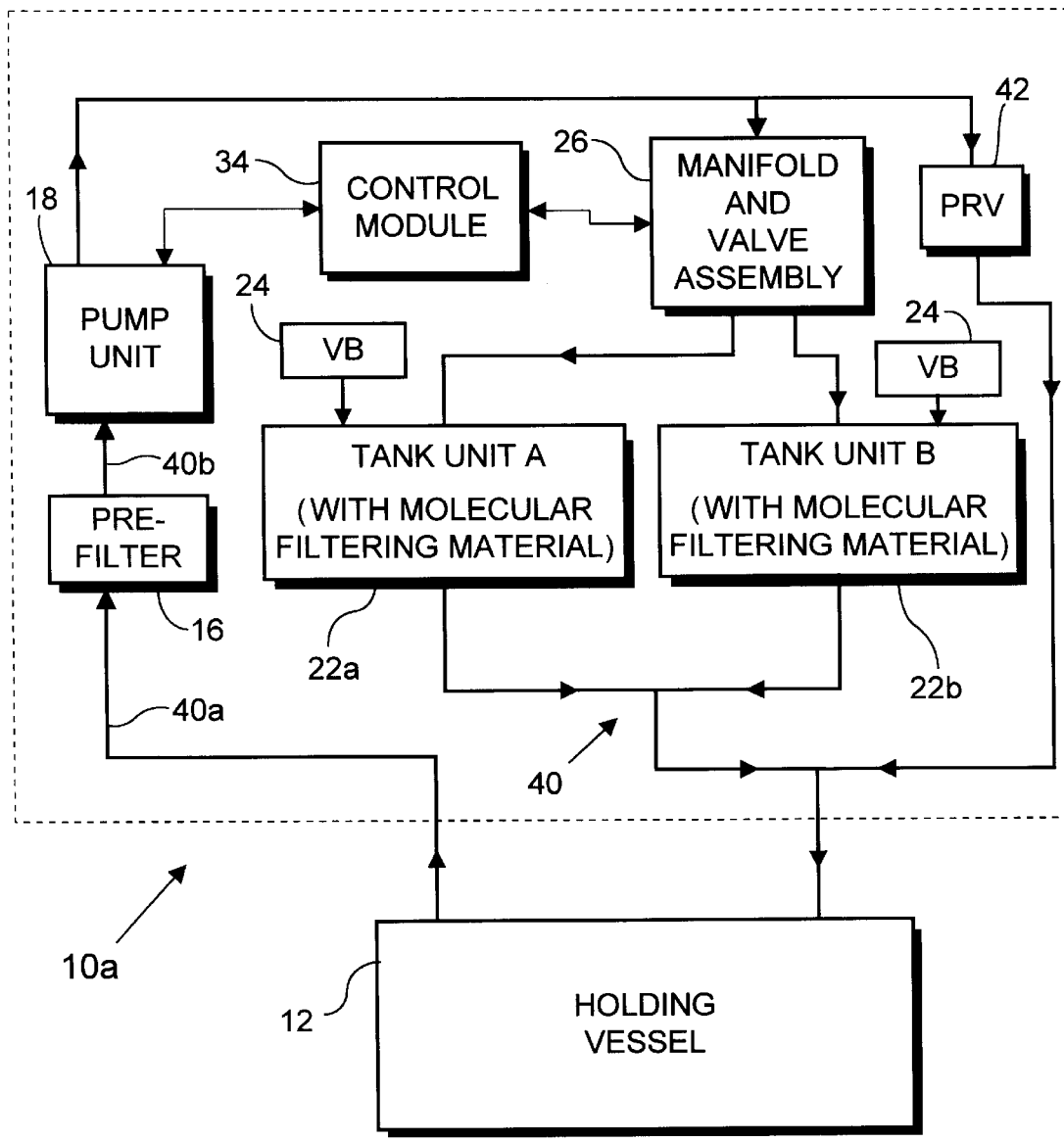
FIG. 3A provides a high level block diagram of a preferred embodiment of the invention.

The simplified arrangement of FIG. 2 may be altered to provide a more preferred embodiment of the effluent treatment apparatus of FIG. 3A, designated 10a. As can be seen in FIG. 3A, dual tank units 22a and 22b, respectively, are provided along with a manifold and valve assembly 26 and a control module 34. The manifold and valve assembly 26, which is responsive to the control module 34, is included to provide for several selectable arrangements of the conduit means 40 and the associated fluidic couplings provided, as required to conduct the specific operator selected 'operation'. For example, one such arrangement of the conduit means 40 would be to direct effluent through at least one selected tank unit 22a or 22b, for a pre-determined temporal interval. The manifold and valve assembly 26 may be assumed to incorporate (or provide) some, or in a preferred embodiment thereof, most of the conduit means 40. Accordingly, a preferred embodiment of the manifold and valve assembly 26 will be best realized by a compact modular unit, minimizing the overall length of conduit required and the associated volume (space) occupied thereby. Further, it is contemplated that a most preferred embodiment of the manifold and valve assembly 26 may be configured having directly coupled thereto a plurality of electronically actuated valves (V1–V5, as shown in FIGS. 3B, 4A, 4B and 4C) which may be configured to be individually responsive to the control module 34. The direct coupling of the valves V1–V5 to the manifold and valve assembly 26 further reduces the length (and volume) of conduit means 40 required. In a possibly most preferred embodiment the manifold and valve assembly 26 may include valves constructed with special valve mechanisms providing 2-way and or 3-way fluidic couplings, as required. The operational characteristics of the embodiment of FIG. 3A will be fully addressed when referring to FIGS. 3B, 4A, 4B, and 4C.

Referring again to FIG. 3A, the embodiment of the effluent treatment apparatus 10a provided, may be configured with a pressure release and bypass valve 42, which as shown may be fluidically coupled to shunt the manifold and valve assembly 26, along with the tanks units 22a and 22b. This shunting relationship enables treatment to be effected at or below a pre-selected (and safe) pressure level, even if the flow of effluent though the tank units is significantly restricted. As such, the pressure release and bypass valve 42, as depicted and arranged in FIGS. 3A, 3B and 5A, may be termed a "pressure regulation and bypass arrangement", and is specifically included to insure that the pressure present in the tank units 22 does not exceed a safe pressure level, even in the event of severe fluidic restriction caused by, for example, a malfunctioning valve or a problem with one or more tank units. As skilled individuals will appreciate, the pressure regulation and bypass arrangement, including pressure release and bypass valve 42, provides for the contained closed-loop bypass of effluent wherein (possibly raw or partially treated) effluent is never released to the immediate vicinity surrounding the effluent treatment apparatus 10a. Instead, any bypassed effluent is returned directly to the holding vessel 12, and may be subsequently treated by later 'passes' of the effluent through the respective tank units, including tank unit 22a and tank unit 22b.

Figure 3B:
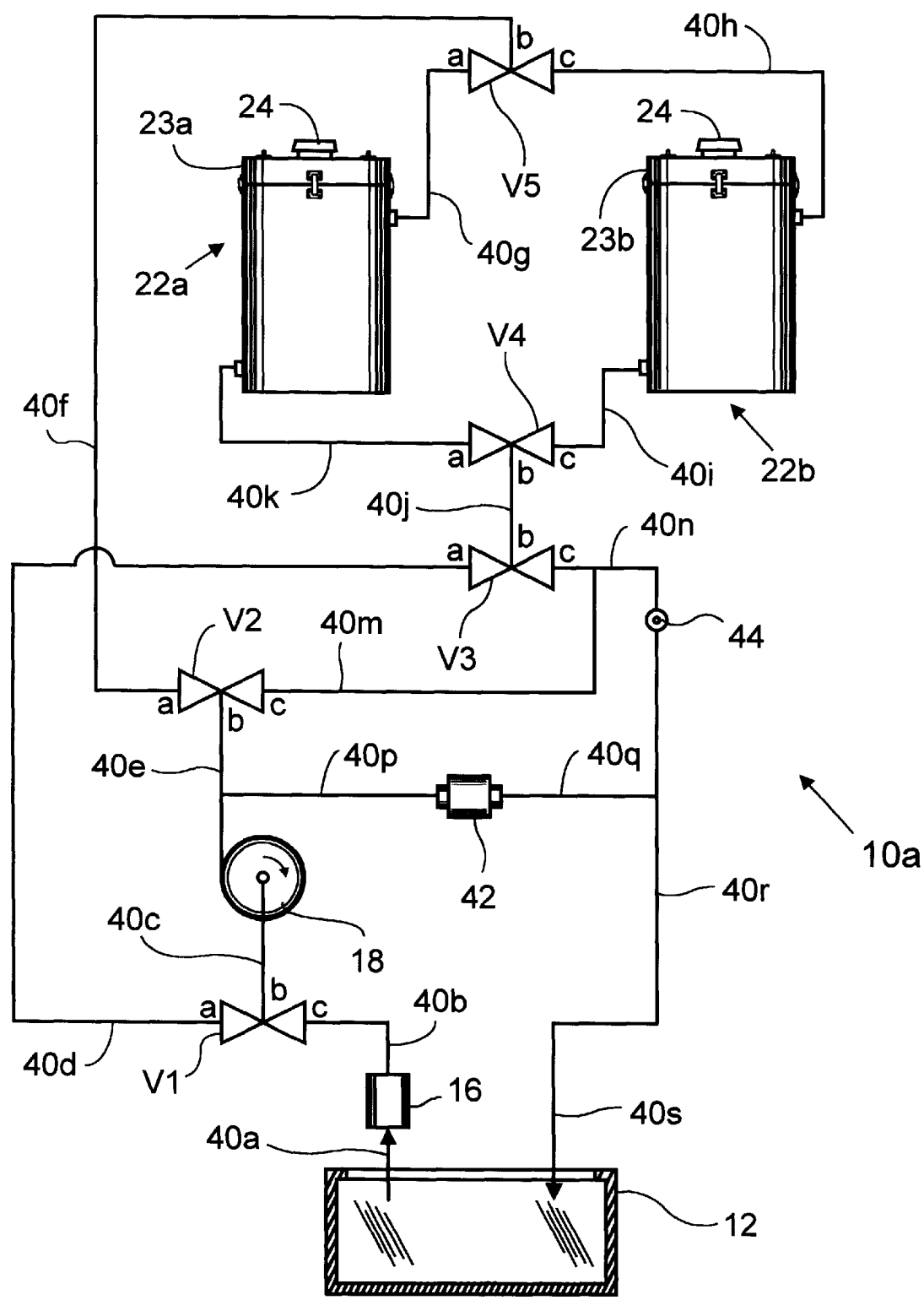
FIG. 3B is a generalized schematic diagram of the preferred embodiment of FIG. 3A, depicting a manifold and valve assembly as discrete and or distributed components.

Turning now to FIG. 3B, there is illustrated a detailed schematic diagram of a preferred embodiment of the invention depicting the manifold and valve assembly 26 as discrete and distributed components. It must be understood that the conduit means, including conduits 40a through 40s, in combination with the valves V1–V5, are included to selectively fluidically couple the holding vessel 12, the pre-filter 16, the pump unit 18, and the tank units 22a and 22b, in order to form at least one closed-loop wherein effluent is drawn from the holding vessel 12, pre-filtered, delivered to at least one tank unit, and returned to the holding vessel 12 via (a portion of) the manifold and valve assembly 26 and the conduit means 40, repeatedly, for the pre-determined temporal interval (as determined by the operator). Accordingly, the contaminants of the effluent can saturate the volume of molecular filtering material 14 in order to fully and completely use the adsorptive capacity available. It should be noted that it is contemplated that in a preferred embodiment the pre-filter 16 may be housed internal to the manifold and valve assembly 26.

Figure 4A:
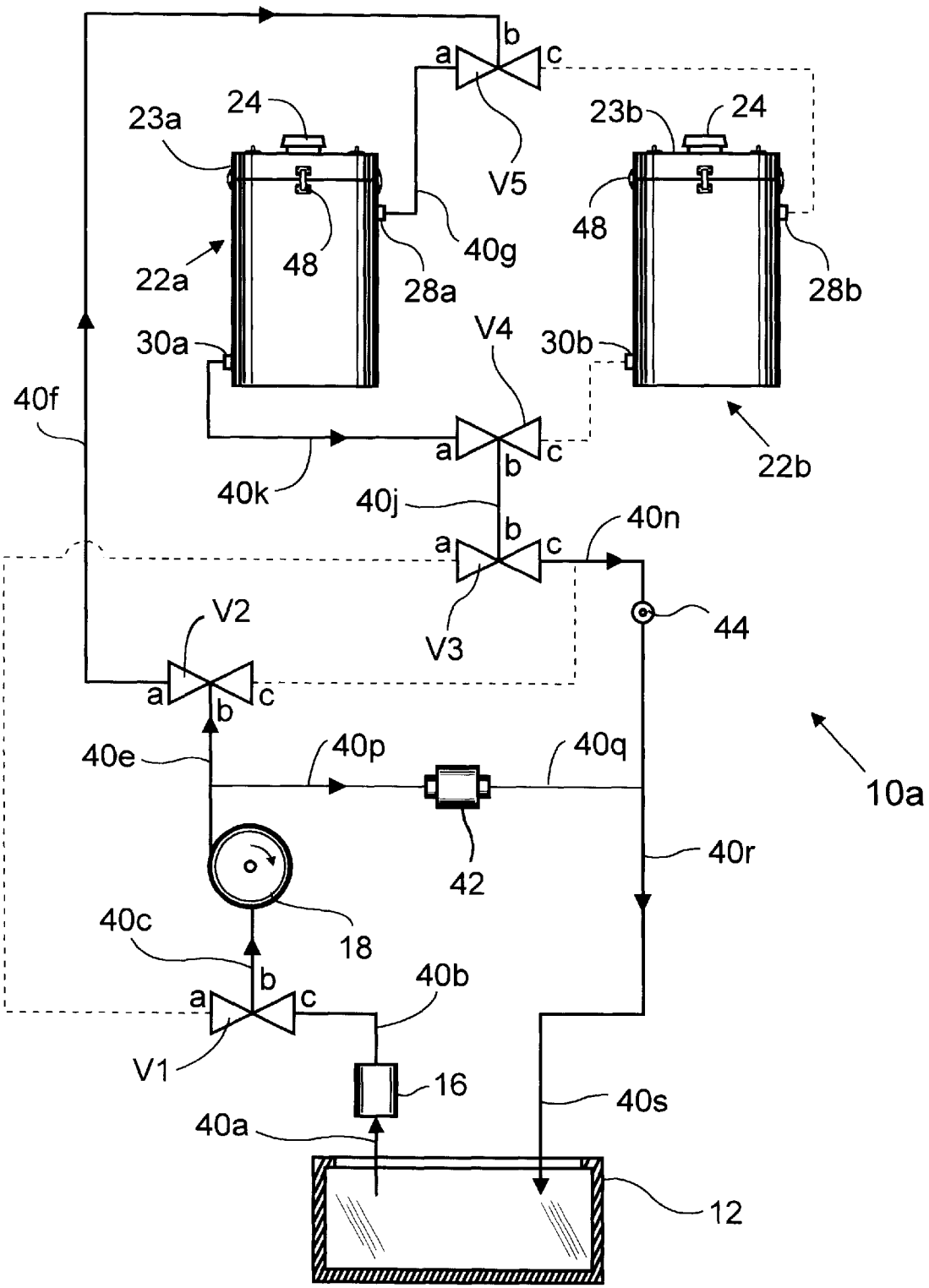
FIG. 4A depicts the schematic diagram FIG. 3B when configured to provide single tank treatment.
Figure 4B:
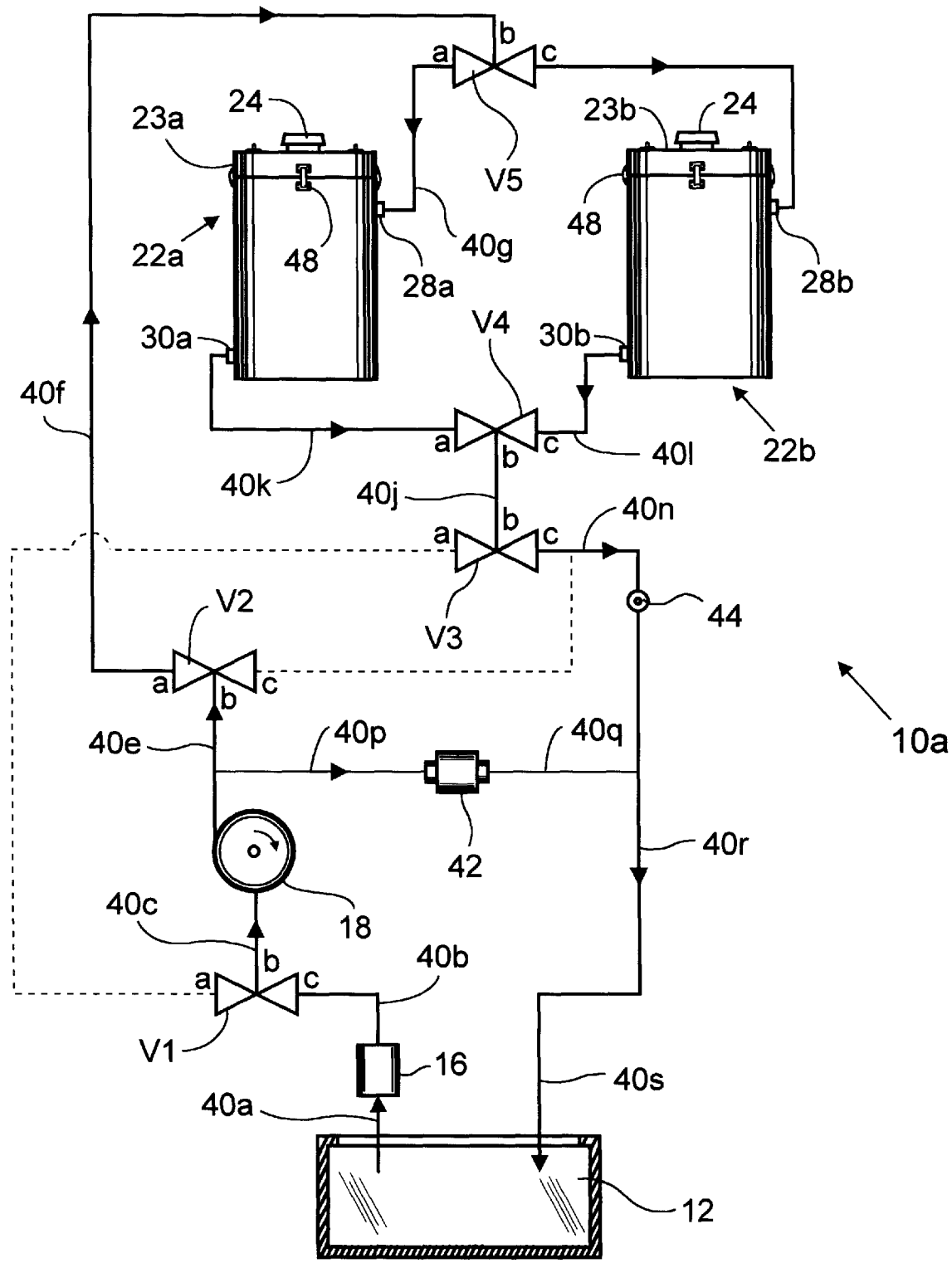
FIG. 4B depicts the schematic diagram FIG. 3B when configured to provide dual tank treatment.
Figure 4C:
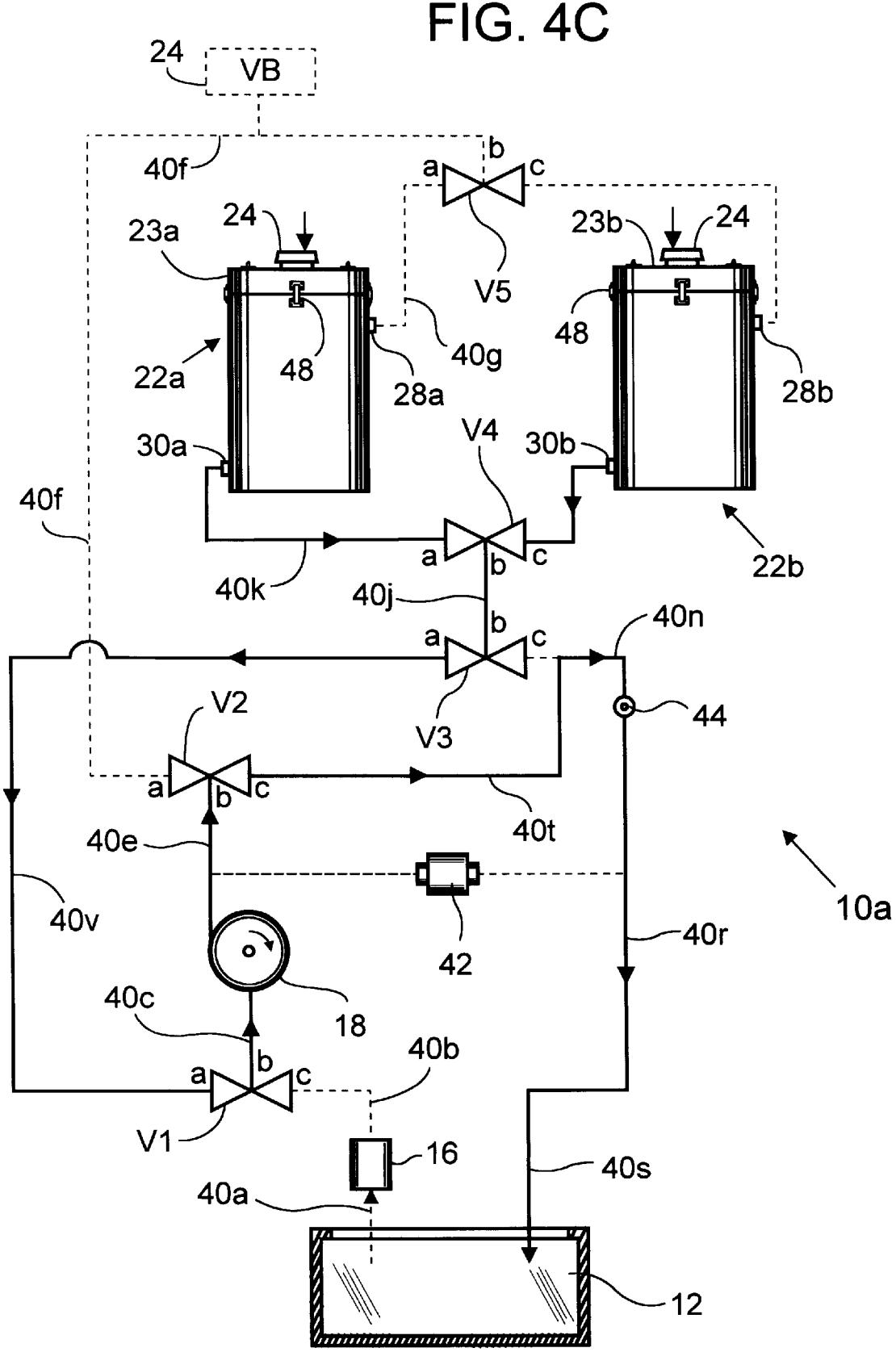
FIG. 4C illustrates the flow of effluent when the embodiment of FIG. 3B is configured to rapidly remove the tankage (of effluent) from each of the tank units.

A number of operational configurations that are supported by the preferred embodiment of FIG. 3B are best seen by examining FIGS. 4A, 4B, and 4C, wherein FIG. 4D provides an associated arrangement of valve settings to establish the necessary fluidic couplings and desired closed-loops. Also included with the embodiment of FIG. 3B is flow meter 44, which is arranged to measure the volume (e.g., gallonage) of effluent that has flowed through the tank units 22a and or 22b, possibly over a plurality of treatment sessions.

FIG. 4A illustrates a configuration of the schematic diagram of FIG. 3B for providing single tank treatment via tank unit 22a. As can be seen, the effluent is drawn from the holding vessel 12 through conduit 40a, pre-filtered by pre-filter 16, drawn through conduits 40b and 40c (by the pump unit 18), and then driven through conduits 40e, 40f, and 40g, to be delivered to treatment tank unit 22a via input port 28a. Accordingly, the flow of effluent through the valves V1 through V5, is as provided in the line 1 of the table of FIG. 4D, which is assigned a mode title of "Single—Tank A". The notation of FIG. 4D provides, for example considering valve V1, that effluent will enter at 'c' and exit at 'b'. Thus, the notation 'c→b' is employed in the third column of the table (labeled V1). Skilled persons will recognize that if the effluent exiting the pump unit 18 produces a pressure of too high a level, say above the threshold of pressure release and bypass valve 42, that effluent will be shunted via conduits 40p and 40q, around the selected tank unit 22a, and directly back to the holding vessel 12 (without passing through the flow meter 44). This is an important safety and operational feature of the embodiments of the present invention.

Referring now to FIG. 4B, the embodiment of FIG. 3B may be configured to provide dual tank treatment sessions. If the valves are configured (set) as shown in line 3 of the table of FIG. 4D, the effluent treatment apparatus will provide for the delivery of pre-filtered effluent to each of the tank units 22a and 22b, which would be loaded with appropriate volumes of MFM 14. As can be seen in the table of FIG. 4D, valve V5 is arranged (set) to enable effluent to enter at 'b' and exit at 'a' and 'c', hence the notation 'b→a,c' is employed. Therefore, effluent is delivered to each of the tank units 22a and 22b. As will be appreciated by skilled persons, each tank unit of FIG. 4B, may be loaded with a particular molecular filtering material in order to effect the removal of one or more particular and distinct contaminants (by each respective tank unit). Further; if the order in which the contaminants of the effluent are to be treated is important, the tank units 22a and 22b may be sequentially selected having effluent delivered to each respective tank unit in a preferred order or sequence.

Turning now to FIG. 4c, there is illustrated the embodiment of FIG. 3B configured to provide for the rapid removal of the tankage (of effluent) from each selected tank unit 22a and or 22b. As illustrated, the pump unit 18 is now provided with the appropriate fluidic couplings to draw effluent from either of the tank units 22a and 22b, as determined by the configuration (setting) of valve V4. The configuration of the valves for the dual forced draining of both tank units 22a and 22b is provided in line 4 of the table of FIG. 4D. It should be noted that the arrangement of valve V5 is shown with a 'No Flow' designation in line 4 of the table. This may be assumed to be so due to the entry of (vacuum preventing) air via vacuum breakers 24, depicted as being situated in the center of the movable portion 23a and 23b, of the respective tank units 22a and 22b. It must be understood that the vacuum breakers 24 of FIG. 3B, and FIGS. 4A–4C, are illustrative only, and other arrangements are contemplated, including the providing of a single vacuum breaker 24 suitably coupled to conduit 40f, and providing an input supply of air to the tank units via valve V5 and conduits 40g and 40h. This modification, as well as others, are contemplated as being within the scope of the embodiments disclosed herein, including the embodiments of FIG. 3A, 3B, and 5A.

Figure 5A:
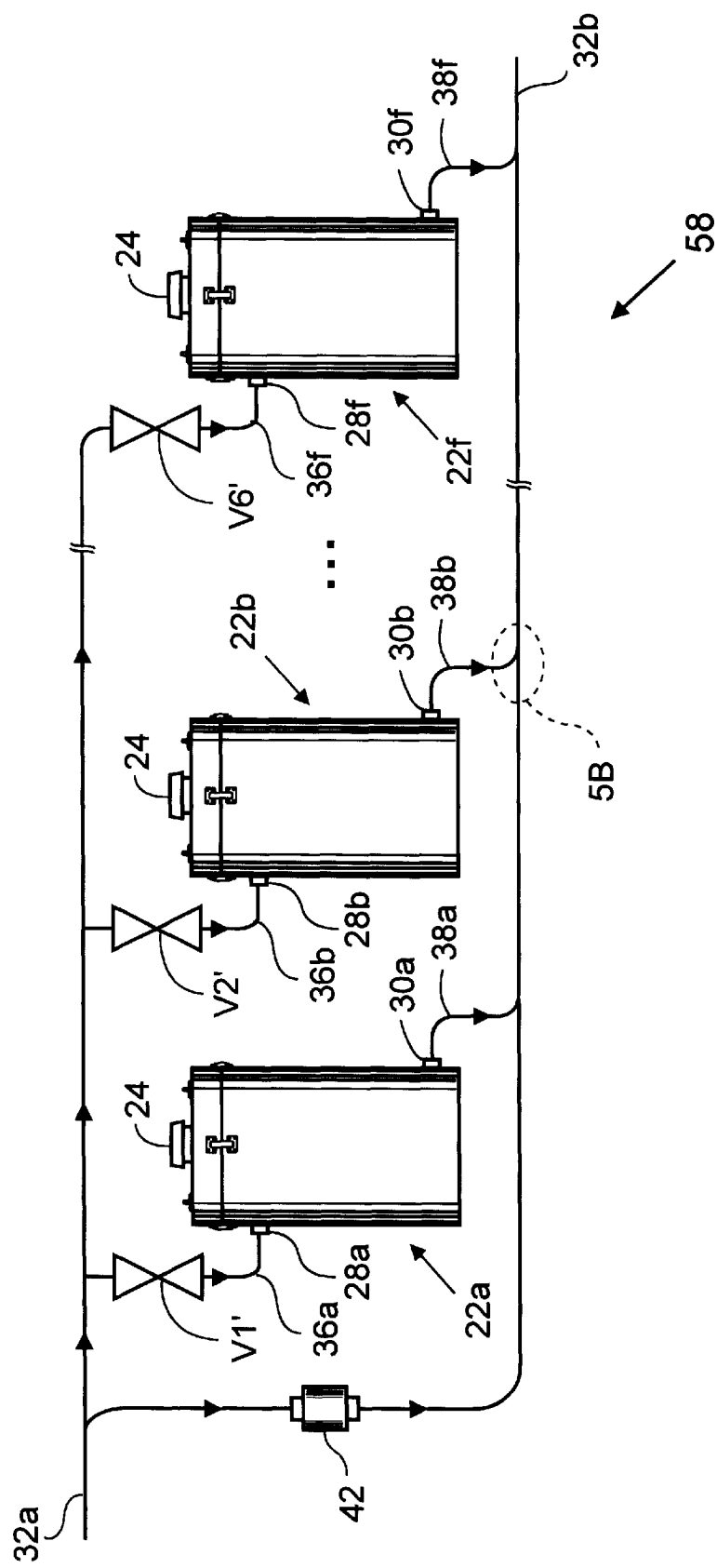
FIG. 5A provides an alternate arrangement for the tank units that may be employed with the various embodiments of the invention.
Figure 5B:
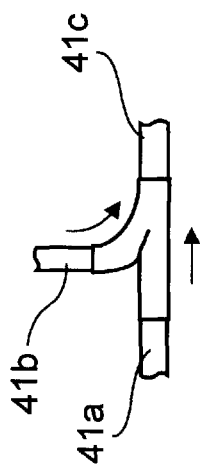
FIG. 5B provides an enlarged view of a junction employable to fluidically join effluent carrying conduits composing a portion of the conduit means.

Alternate arrangements may be provided that also support the closed-loop operation as described, for example, when referring to the embodiment of FIG. 3B. Consider one possibly preferred alternate arrangement of tank units, as depicted in FIG. 5A. It should be assumed that the input conduit 32a is providing effluent from the holding vessel 12 (and forcedly delivering it to the respective tank units), while the output conduit 32b is returning effluent to the holding vessel 12. As shown, a plurality of treatment tank units 22a, 22b, . . . 22f, are provided in a parallel configuration, wherein valves V1' through V5' enable the operator to select, by way of the control module 34, one or more of the tank units to be activated and utilized during at least one temporal interval of a treatment session. For example, assume valves V1' and V2' are open and effluent is being delivered to the tank units 22a and 22b, respectively. If the other four valves V3' (not explicitly shown) through V6' are closed, preventing effluent from entering the respective tank unit, then an astute observer would understand that the draining of effluent (enabled in part by the vacuum breakers 24) is possible. Indeed, if the 'return couplings' of the output ports 30a through 30f, are provided as illustrated in FIG. 5B, it is certainly possible to arrange for the unselected (and inactive) tank units to be drained. At minimum, the draining of unselected tank units may be possible employing 'gravity assisted' draining as discussed above when referring to FIG. 1.

A possible arrangement contemplated to enhance the draining of tankage from unselected tank units, would employ a compressed air source (not shown) for force the tankage from unselected tank units. If a source of compressed air is available, this approach would eliminate the need for additional pump units to be provided to forcibly drain unselected tank unit. Skilled individuals can provide yet other modifications and alterations to the present invention to support the (somewhat) rapid removal of the tankage of an unselected tank unit.

In order to not obfuscate the essential functional and operational characteristics and features of the various embodiments of the present invention as illustrated in FIGS. 1, 2, 3B, and 4A through 4C, the control module 34 (of FIG. 3A) and the associated operative (e.g., electrical) couplings necessary to support the operation of the system components including the valves V1–V5, and the pump unit 18, have been omitted. The operation of, and a possible high level architecture for, the control module 34 will be provided when referring to FIGS. 6A and 6B (below). It should be understood that suitable arrangements of appropriate operative couplings of the control module 34, the pump unit 18, and the valves, are certainly well known in the art and may be provided by skilled persons.

Figure 6A:
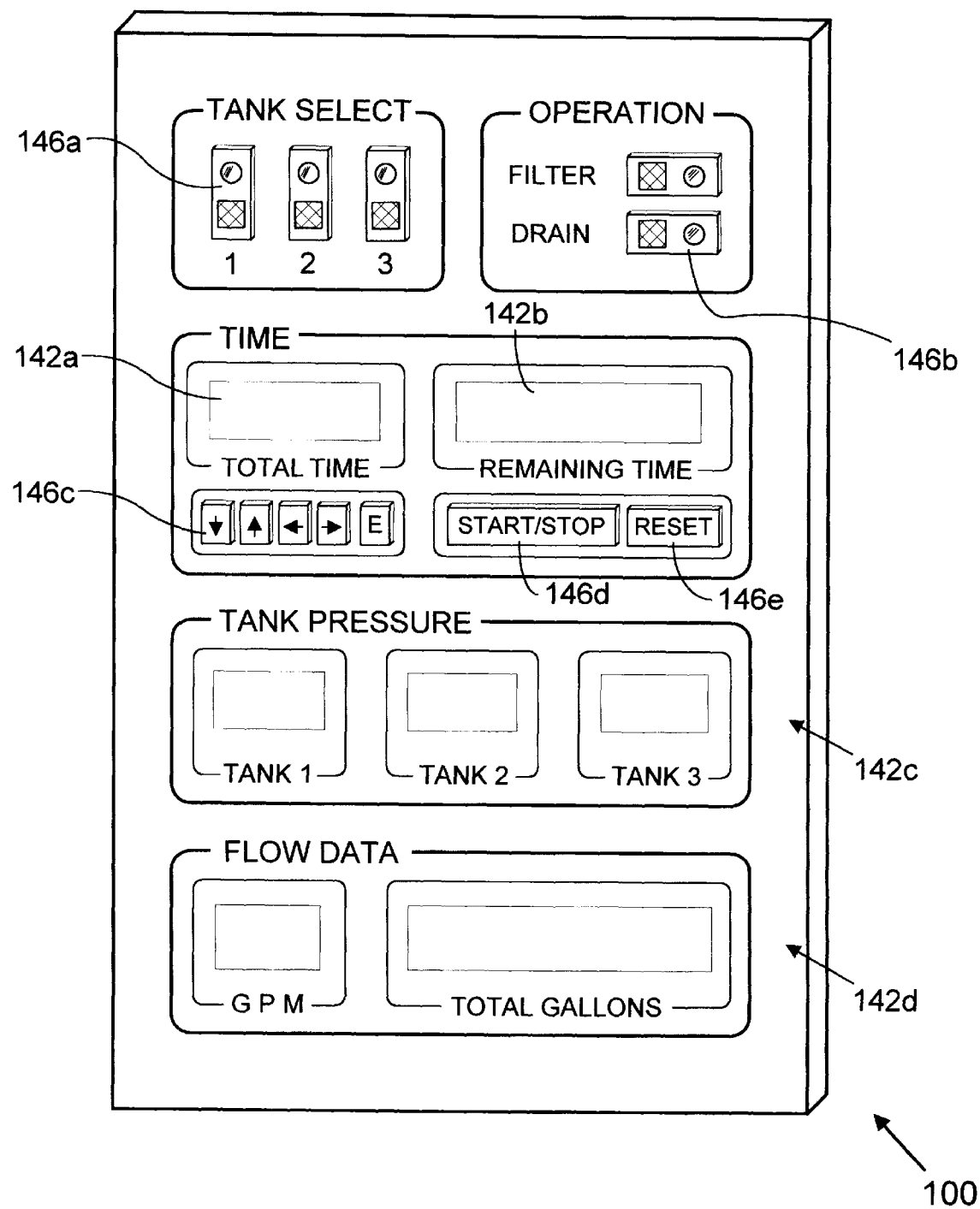
FIG. 6A illustrates an embodiment of a control panel that may be provided in accordance with the present invention.

Turning now to FIG. 6A, shown is an embodiment of a control panel 100 that may be provided in accordance with the present invention. The control panel 100 will be used to describe a typical set of operator activities and observations possible, thereby providing an overview of the operation of effluent treatment apparatus 10a. It should be noted that although the control panel 100 is depicted for a three (3) tank unit embodiment, the features and operational characteristics can be reduced or extended to apply to embodiments including 2, 4, 5, or more tank units. For this example, it may be assumed that each of the tank units 22 of the apparatus have been loaded (filled) with appropriate volumes of the molecular filtering material 14. It may be noted that the actual "appropriate" volume of the molecular filtering material will typically be determined by the particular volume and composition of the effluent to be treated.

The operator may proceed as follows. First, the TANK SELECT switch means 146a would be generally used to select the tank units to be active to provide for the treatment of effluent. For this embodiment the operator may select any tank unit by simply depressing the associated switch means 146a. Next, the specific operation is selected. For this example a FILTER operation will be performed (e.g., the switch means 146b labeled FILTER is depressed and the FILTER mode is selected). The operator may then set the TOTAL TIME for the treatment session. Typical total treatment session time intervals or temporal periods may range from 5 to 15 hours, but should always be determined by the particular composition of the volume of effluent to be treated. For this example, the operator may input, using switch means 146c, a TOTAL TIME of 8 hours. It is contemplated in a preferred embodiment of the present invention, that this time (e.g., 8 hours), as displayed on display 142a, would remain fixed for the entire treatment session.

Figure 6B:
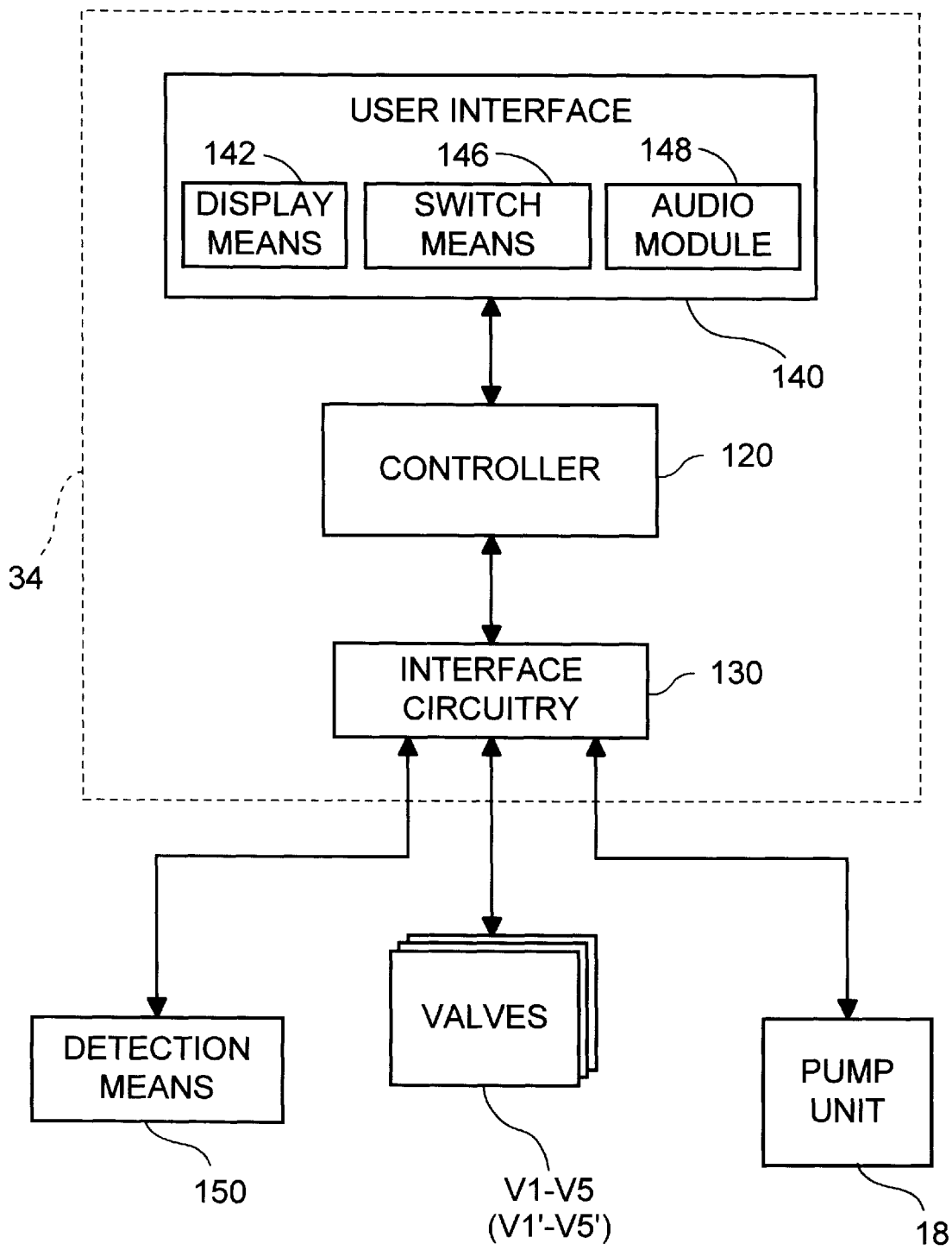
FIG. 6B is a high-level block diagram of an embodiment of the control module, as depicted in FIG. 3A, which is consistent with the features and characteristics of the control panel of FIG. 6A.

Once the tanks have been loaded (with MFM) and selected (for treatment), the FILTER operation indicated, and the total run time has been established (input), the apparatus may be started by depressing the START/STOP switch means 146d. The control module 34, as will be addressed when referring to FIG. 6B, is arranged to energize and deenergize the pump unit 18, respectively, to start and stop the drawing of effluent from the holding vessel 12. A treatment session and activities typically would commence with the TOTAL TIME setting, being copied to the REMAINING TIME display 142b, and the energizing of the pump unit 18. Accordingly, the REMAINING TIME display 142b is contemplated to the tank unit 22 through the input port 28, treated by to operate as a 'count-down' timer always indicating the length of time (temporal period) remaining in a treatment session. In preferred embodiments of the invention, the displays 142a and 142b may be configured having a resolution of minutes, and may be provided by, for example, LED type displays. During the treatment session the pressure in each tank unit may be displayed, in appropriate units, on the TANK PRESSURE displays 142c (if such displays are provided). A typical pressure that may be employed (and established via the pressure release and bypass valve 42) may be in the range of 5 to 50 pounds per square inch. Also, FLOW DATA including the gallons being treated per unit time (e.g., gallons/minute, or GPM) and the total gallons treated may be ascertained by the operator by monitoring displays 142d. It should further be noted that the total gallons may include displaying the total gallons for a particular treatment session and or a cumulative total resulting from a plurality of sessions. For example, the total gallons may be monitored (if not lost via a RESET operation) to indicate when the effluent treatment apparatus 10, 10a, and or 10b, has reached a time when service and preventive maintenance if required. As understood by skilled persons, the actual flow rate will vary considerably with a number of factors, including the number of selected tank units 22, the inside diameter of the conduit means 40 and values, and the size and characteristics of the pump unit 18.

It should be noted that the actual 'completion' of a treatment session may be determined by a total temporal period, or the number of gallons of effluent that have flowed through the treatment tank units, or both. Further, it is always desirable to test and verify the level of contaminants has been lowered to the appropriate and acceptable levels referring again to FIG. 6A, there is also provided a RESET switch means 146e which may be employed by an operator to, for example, reset the control module (including the various displays and or deselect any and all selected tank units.

Turning now to FIG. 6B, there is provided a block diagram of an embodiment of the control module 34, and various other components, of FIG. 3A. The embodiment of FIG. 6B is, for all practical purposes, intended to be consistent with the control panel 100 of FIG. 6A. Accordingly, a user interface 140 (of FIG. 6B) includes display means 142, which may be assumed to provide, respectively, the displays 142a, 142b, 142c, and 142d of FIG. 6A. Similarly, the switch means 146 of FIG. 6B may be assumed to be representative of the switch means 146a through 146e of FIG. 6A. The user interface 140 may also include an audio module 148 to deliver audio prompts and possibly alarm-like signals to the operator or another nearby individual. Therefore, the user interface 140, which as shown FIG. 6B is operatively coupled to a controller 120, is provided to enable the exchange of information between the operator and the controller 34. Where the information exchanged includes operator inputs via the switch means 146, displayed information provided by the display means 142, and audio information in the form of error warnings, audio prompts, and other sounds, which are delivered by audio module 148. Error situations may also be annunciated via the display means 142. For example, an 'error situation code' indicating detection means 150 has determined the movable portion 23 of one or more tank units 22 is not secured in the closed position (as required for treatment) may be provided by a flashing 'E1' being displayed on the GPM portion of the display 142d.

The controller 120 is included with the control module 34 to provide the operational functionality (as discussed above) to automate the treatment of effluent by enabling the operator to initialize, configure, and generally conduct treatments of effluent with the effluent treatment apparatus, such as 10 or 10a, of the present invention. The controller 120 may be provided by many well known programmable devices including microcontrollers, microprocessors, complex programmable logic devices (CPLDs), and or field programmable gate array devices (FPGAs). Interface circuitry 130 may be included (possibly partially or entirely provided by the particular controller 120 employed) to operatively couple the valves V1 through V5, the pump unit 18, and possibly detection means 150. As eluded to above, the detection means 150, also depicted in FIG. 1, is included to determine if the tank unit 22 is securely in the closed position before the pump unit 18 may be activated by the control module 34. In a preferred embodiment the detection means 150 may be provided by one or more micro or magnetic switches, that are operatively coupled to the controller 120.

It should be noted that safety means in addition to detection means 150 are contemplated for use with the present invention. For example, an over pressure shutdown mechanism (not illustrated) may be provided to sense over pressure situations which may pose a safety risk to the operator, other nearby persons, and or the effluent treatment apparatus 10/10a itself. In addition, it may be desirable to sense a low pressure situation, caused for example by a loss of prime in the pump unit 18, which may result in damage to the pump unit 18 (running 'dry') if not detected and corrected. In the each of the situations above (including either low or high pressure), an automatic shutoff of the pump unit 18 and the sounding of an audio alarm (possibly via audio module 148) may be provided with the various embodiments of the present invention.

Figure 7:
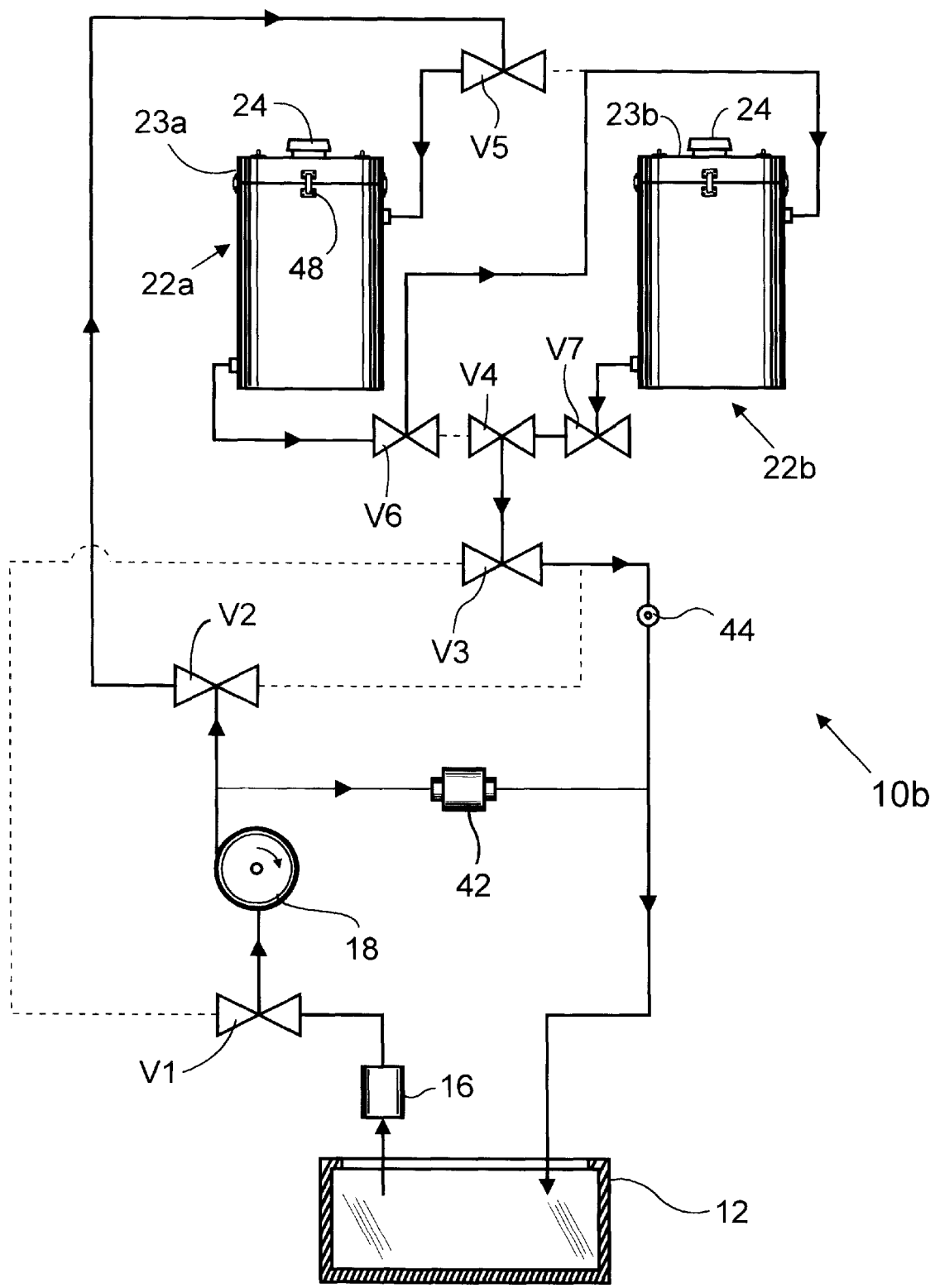
FIG. 7 is a generalized schematic diagram of another preferred embodiment of the present invention which supports a series arrangement of treatment tank units.

Turning now to FIG. 7, there is depicted yet another embodiment of the effluent treatment apparatus, designated 1ob, which includes two additional valves V6 and V7. The additional valves V6 and V7 are suitably arranged (as illustrated) to enable the tank units 22a and 22b to be configured in a series arrangement. Accordingly, the embodiment of FIG. 7 may be configured (as shown) to enable effluent to be drawn from the holding vessel 12 and delivered first to the tank unit 22a, and then to the second tank unit 22b, before being returned to the holding vessel. This and other similar configurations of the effluent treatment apparatus, especially when a plurality of tank units are arranged in various series and parallel arrangements, are contemplated.

It must be understood that the present invention may be employed with a "pump unit" which is arranged to draw effluent into the tank units by creating a vacuum. This arrangement is not illustrated. However, consider the following example. Assume a vacuum producing pump unit is employed and situated 'after' the tank unit or tank units, say in-line between valves V4 and V3 of FIG. 3B. Further assume, for simplicity, that the vacuum breakers 24 have been omitted. With this arrangement the MFM 14 may provide the function of the pre-filter 16. As such, with this configuration, the vacuum breakers 24 and the pre-filter 16 may be omitted.

While there have been described a plurality of the currently preferred embodiments of the present invention, along with varied methods of operation, those skilled in the art will recognize that other and further modifications may be made without departing from the invention, and it is intended to claim all modifications and variations as fall within the scope of the invention and the appended claims.

What is claimed is:

1. An effluent treatment apparatus for treating a volume of effluent contained within a holding vessel, the treatment including the forced contacting of the effluent with surface areas of a volume of a molecular filtering material, the effluent treatment apparatus comprising:

(a) a plurality of treatment tank units, each having an input port to enable the effluent to enter the tank unit and contact the molecular filtering material that is contained and enclosed therein, and an output port to enable the effluent to exit the tank unit after contacting the molecular filtering material, each tank unit further configured with a movable portion having an open position enabling the molecular filtering material to be placed within or removed from the respective tank unit, and a closed position for conducting treatment of the effluent;

(b) a pump unit employable to draw effluent from the holding vessel and effect the delivery of the effluent to at least one of the tank units, and further employable to forcibly drain at least one tank unit to enable servicing of each forcibly drained tank unit;

(c) a pre-filter positioned in-line with and before the pump unit so as to filter and remove from the effluent any larger debris material contained therein as the effluent is drawn from the holding vessel and delivered to the treatment tank units via the pump unit;

(d) a control module;

(e) a manifold and valve assembly structured with a plurality of electronic valves for controlling 3-way fluidic couplings, the manifold and valve assembly responsive to the control module and configurable to enable the delivery of effluent to at least one selected tank unit for a pre-determined temporal interval, even while a second tank unit is open, and is further configurable to enable at least one tank unit to be forcibly drained via the pump unit to remove effluent present therein to facilitate servicing, even while a second tank unit is open;

(f) conduit means to fluidically couple the holding vessel, the pre-filter, the pump unit, the manifold and valve assembly, and the tank units;

(g) the conduit means and manifold and valve assembly capable of forming closed-loops wherein effluent is drawn from the holding vessel, pre-filtered, delivered to at least one tank unit for treatment via the pump unit, and returned to the holding vessel, repeatedly, for the pre-determined temporal interval, and is further capable of forming closed-loops wherein effluent is forcibly drained from at least one tank unit via the pump unit and returned to the holding vessel; and (h) a pressure regulation and bypass arrangement coupled via the conduit means in a shunting configuration so as to shunt the manifold and valve assembly, and the tanks units, to enable effluent treatment to be effected at or below a pre-selected pressure level, even if the flow of effluent though the tank units is significantly restricted;

(i) the treatment apparatus thereby supporting a treatment process including the forced flowing of effluent through at least one tank unit for a sufficient temporal interval, at or below the pre-selected pressure level, to enable the contaminates present in the effluent to be reduced, at least in part, to acceptable levels to possibly enable the treated effluent and associated volumes of molecular filtering material to be discarded in a manner consistent with that of non-toxic waste.

2. The effluent treatment apparatus according to claim 1, wherein the conduit means and the manifold and valve assembly are structured to enable any one of the following actions to be selected and carried out:

(a) forcibly draining one tank unit while a second tank unit is being serviced to replace a volume of molecular filtering material in the second tank unit;

(b) forcibly draining a plurality of tank units to enable the servicing of the tank units to replace a volume of molecular filtering material present in each respective tank unit; and (c) servicing a tank unit with the movable portion in the open position while a second tank unit is treating effluent by the forced flowing of the effluent through the second tank unit.

3. The effluent treatment apparatus according to claim 1, wherein each tank unit further includes a vacuum breaker to provide an input supply of air to a tank unit while a volume of effluent present within the tank unit is being forcibly drained and returned to the holding vessel.

4. The effluent treatment apparatus according to claim 3 wherein the control module enables a plurality of the tank units to be selected sequentially for treatment activities.

5. The effluent treatment apparatus according to claim 4 wherein the input port and output port of each tank unit are diametrically positioned to as to maximize the contacting of the effluent with the surface areas of the molecular filtering material with each pass of the volume of the effluent though the selected tank units.

6. The effluent treatment apparatus according to claim 5, wherein the manifold and valve assembly is a compact modular unit, minimizing the overall length of conduit, and volume occupied thereby, and having directly coupled thereto a plurality of electronically actuated valves that are responsive to the control module.

7. The effluent treatment apparatus according to claim 6 further including a detection means to enable the control module to determine if a respective selected tank unit is securely in the closed position before the pump unit is energized.

8. An effluent treatment apparatus for treating a volume of effluent contained within a holding vessel to neutralize contaminants contained therein, the treatment including the forced contacting of the effluent with surface areas of a volume of a molecular filtering material, the effluent treatment apparatus comprising:

(a) a plurality of treatment tank units, each structured having an input port to enable effluent to enter the tank unit and contact the molecular filtering material contained and enclosed therein, and an output port to enable effluent to exit the tank unit after contacting the molecular filtering material;

wherein each tank unit is further configured with a movable portion having an open position enabling molecular filtering material to be placed within or removed from a respective tank unit, and a closed position for conducting treatment of the effluent;

(b) a pump unit responsive to a control module and employable to draw effluent from the holding vessel and effect the delivery of the effluent to at least one of the tank units, the pump also employable to forcibly drain at least one selected tank unit even while the movable portion of another tank unit is in the open position;

(c) the control module;

(d) a manifold and valve assembly responsive to the control module and configurable to enable the either one of the delivery of effluent to at least one selected tank unit for a pre-determined temporal interval, and further configurable to enable at least one tank unit to be forcibly drained to remove effluent present therein to facilitate servicing of each drained tank unit;

(e) conduit means to fluidically couple the holding vessel, the pump unit, the manifold and valve assembly, and the tank units;

the conduit means and manifold and valve assembly capable of selectively forming at least one closed-loop wherein either one of, effluent is delivered to at least one selected tank unit for a pre-determined temporal interval to effect treatment of the effluent, and effluent is forcibly drained from at least one tank unit to remove effluent contained therein to facilitate servicing of each drained tank unit; and (f) a pressure regulation and bypass arrangement coupled via the conduit means in a shunting configuration so as to shunt the manifold and valve assembly, along with included tank units, to enable effluent treatment to be effected at or below a pre-selected pressure level, even if the flow of effluent though the tank units is significantly restricted.

9. The effluent treatment apparatus according to claim 8 wherein a pre-filter is positioned in-line with and before the pump unit so as to filter and remove any larger debris material contained in the effluent drawn from the holding vessel and delivered to the treatment tank units via the pump unit.

10. The effluent treatment apparatus according to claim 9 wherein the control module includes:

(a) a controller;

(b) a user interface, operatively coupled to the controller, to enable the exchange of information between a user and the controller; and (c) an interface module, responsive to the controller, to enable the pump unit to be started and stopped under control of the controller.

11. The effluent treatment apparatus according to claim 10, wherein the user interface and the control module enable a user to configure and control the manifold and valve assembly, and the pump unit, to cause any one of the following actions to be selected and carried out:

(a) forcibly draining one tank unit while a second tank unit is being serviced to replace a volume of molecular filtering material in the second tank unit;

(b) forcibly draining each tank unit to enable the servicing of the tank units;

(c) servicing a tank unit with the movable portion in the open position while a second tank unit is treating effluent by the forced flowing of the effluent through the tank unit; and (d) servicing a tank unit with the movable portion in the open position while a second tank unit is being forcibly drained.

12. The effluent treatment apparatus according to claim 11 wherein the control module is arranged to enable a user to automate the treatment of effluent by initializing and configuring the apparatus, including specifying a total run time providing a temporal period for which treatment activities are to occur, and to further indicate which tank units are to be involved with treatment activities.

13. The effluent treatment apparatus according to claim 8, wherein each tank unit includes at least one vacuum breaker to enable the removal of the effluent from a tank unit when the movable section of the tank unit is in the closed position, where the effluent is drained and returned to the holding vessel.

14. The effluent treatment apparatus according to claim 13 further including a detection means that is operatively coupled to the control module to determine if the tank unit is securely in the closed position before the pump unit may be activated by the control module.

* * * * *